US012569836B2

(12) United States Patent
Lee

(10) Patent No.: US 12,569,836 B2
(45) Date of Patent: Mar. 10, 2026

(54) METHOD FOR MANUFACTURING CATALYST FOR CAPTURE AND CONVERSION OF CARBON DIOXIDE

(71) Applicant: LOWCARBON CO., LTD, Gangjingun (KR)

(72) Inventor: Cheol Lee, Cheongju-si (KR)

(73) Assignee: LowCarbon Co., Ltd., Gangjin-gun (KR)

( * ) Notice: Subject to any disclaimer, the term of this patent is extended or adjusted under 35 U.S.C. 154(b) by 297 days.

(21) Appl. No.: 18/040,748

(22) PCT Filed: Jun. 17, 2022

(86) PCT No.: PCT/KR2022/008643
§ 371 (c)(1),
(2) Date: Feb. 6, 2023

(87) PCT Pub. No.: WO2023/043004
PCT Pub. Date: Mar. 23, 2023

(65) Prior Publication Data

US 2024/0269656 A1 Aug. 15, 2024

(30) Foreign Application Priority Data

Sep. 14, 2021 (KR) ........................ 10-2021-0122358

(51) Int. Cl.
*B01J 23/889* (2006.01)
*B01D 53/86* (2006.01)
(Continued)

(52) U.S. Cl.
CPC ...... *B01J 23/8892* (2013.01); *B01D 53/8671* (2013.01); *B01J 29/00* (2013.01);
(Continued)

(58) Field of Classification Search
CPC ...... B01D 2257/504; B01D 2258/0283; B01D 2251/604; B01D 2255/50; B01D 53/62;
(Continued)

(56) References Cited

U.S. PATENT DOCUMENTS

2019/0085254 A1* 3/2019 Lee .......................... C10L 9/10

FOREIGN PATENT DOCUMENTS

KR 1020130130340 A 12/2013
KR 101524458 B1 6/2015
(Continued)

OTHER PUBLICATIONS

Aquino, et.al. ("CO2 adsorption capacity of zeolites synthesized from coal fly ashes", Fuel 276 (2020) 1181) (Year: 2020).*
KR20190040553a, English translation (Year: 2019).*

*Primary Examiner* — In Suk C Bullock
(74) *Attorney, Agent, or Firm* — ArentFox Schiff LLP; Yun H. Choe

(57) ABSTRACT

Proposed is a method for manufacturing a catalyst for capture and conversion of carbon dioxide capable of removing carbon dioxide and converting carbon dioxide into other useful materials at the same time by capturing and converting carbon dioxide in flue gas generated during fossil fuel combustion into a carbon resource and a catalyst for capture and conversion of carbon dioxide manufactured by the method of the same. The catalyst for capture and conversion of carbon dioxide according to the present disclosure can reduce carbon dioxide by capturing carbon dioxide in flue gas generated during fossil fuel combustion. It is possible to convert the captured carbon dioxide into other useful materials by converting the collected carbon dioxide into sodium carbonate or sodium hydrogen carbonate as carbon resources.

6 Claims, 4 Drawing Sheets

(51) Int. Cl.

| | |
|---|---|
| ***B01J 29/00*** | (2006.01) |
| ***B01J 29/076*** | (2006.01) |
| ***B01J 37/00*** | (2006.01) |
| ***B01J 37/03*** | (2006.01) |
| ***B01J 37/04*** | (2006.01) |

(52) U.S. Cl.

CPC ......... *B01J 29/076* (2013.01); *B01J 37/0036* (2013.01); *B01J 37/035* (2013.01); *B01J 37/04* (2013.01); *B01D 2255/2022* (2013.01); *B01D 2255/2025* (2013.01); *B01D 2255/2027* (2013.01); *B01D 2255/2045* (2013.01); *B01D 2255/2047* (2013.01); *B01D 2255/20707* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/20784* (2013.01); *B01D 2255/20792* (2013.01); *B01D 2255/2092* (2013.01); *B01D 2255/30* (2013.01); *B01D 2257/504* (2013.01); *B01D 2258/0283* (2013.01)

(58) Field of Classification Search

CPC ...... B01J 23/002; B01J 29/06; B01J 2523/00; Y02C 20/40

See application file for complete search history.

(56) References Cited

FOREIGN PATENT DOCUMENTS

| | | | | |
|---|---|---|---|---|
| KR | 101684805 | B1 | | 12/2016 |
| KR | 101864999 | B1 | | 6/2018 |
| KR | 20190040553 | A | * | 4/2019 |
| KR | 1020190040553 | A | | 4/2019 |
| KR | 100903778 | B1 | | 6/2019 |
| KR | 1020190069000 | A | | 6/2019 |

* cited by examiner

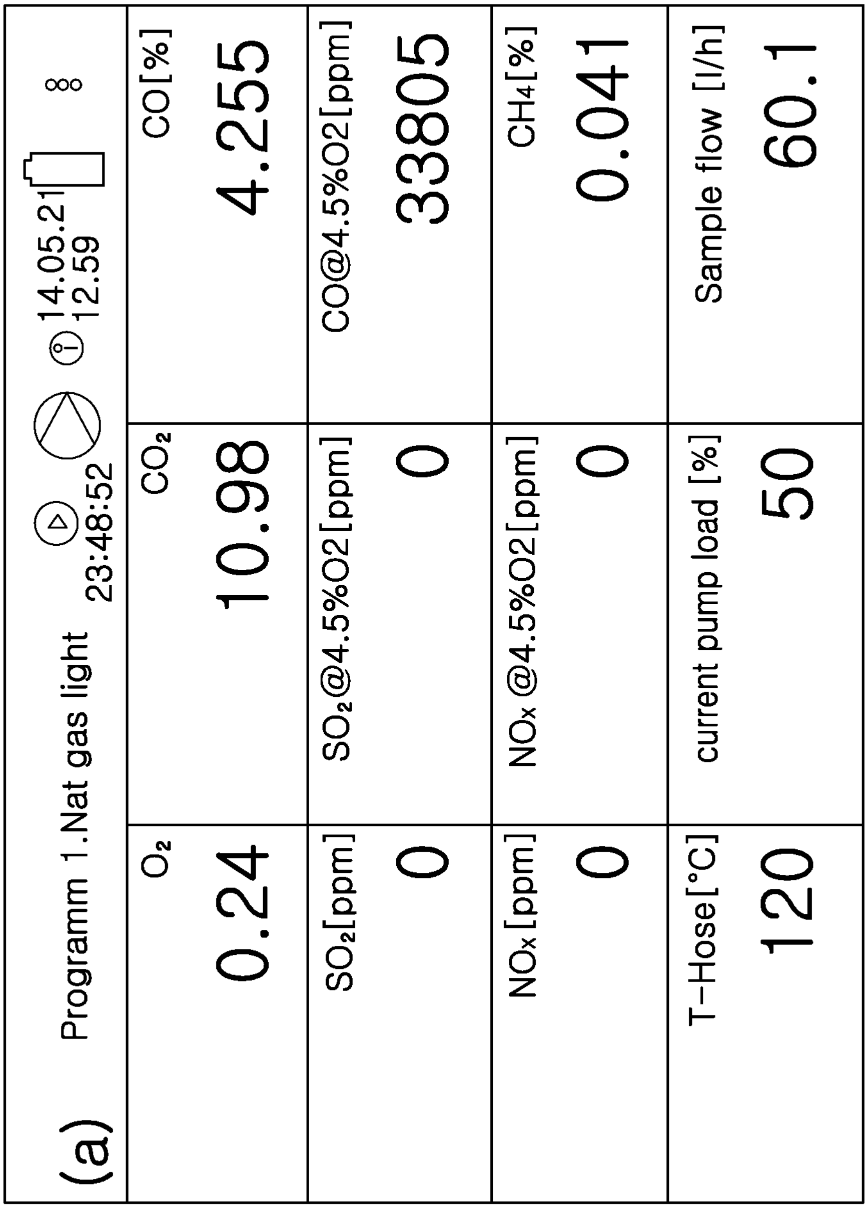
[FIG. 1A]
(a)
Programm 1.Nat gas light    14.05.21 12.59
23:48:52
| O₂ | CO₂ | CO[%] |
|---|---|---|
| 0.24 | 10.98 | 4.255 |
| SO₂[ppm] | SO₂@4.5%O2[ppm] | CO@4.5%O2[ppm] |
|---|---|---|
| 0 | 0 | 33805 |
| NOₓ[ppm] | NOₓ @4.5%O2[ppm] | CH4[%] |
|---|---|---|
| 0 | 0 | 0.041 |
| T−Hose[°C] | current pump load [%] | Sample flow [l/h] |
|---|---|---|
| 120 | 50 | 60.1 |

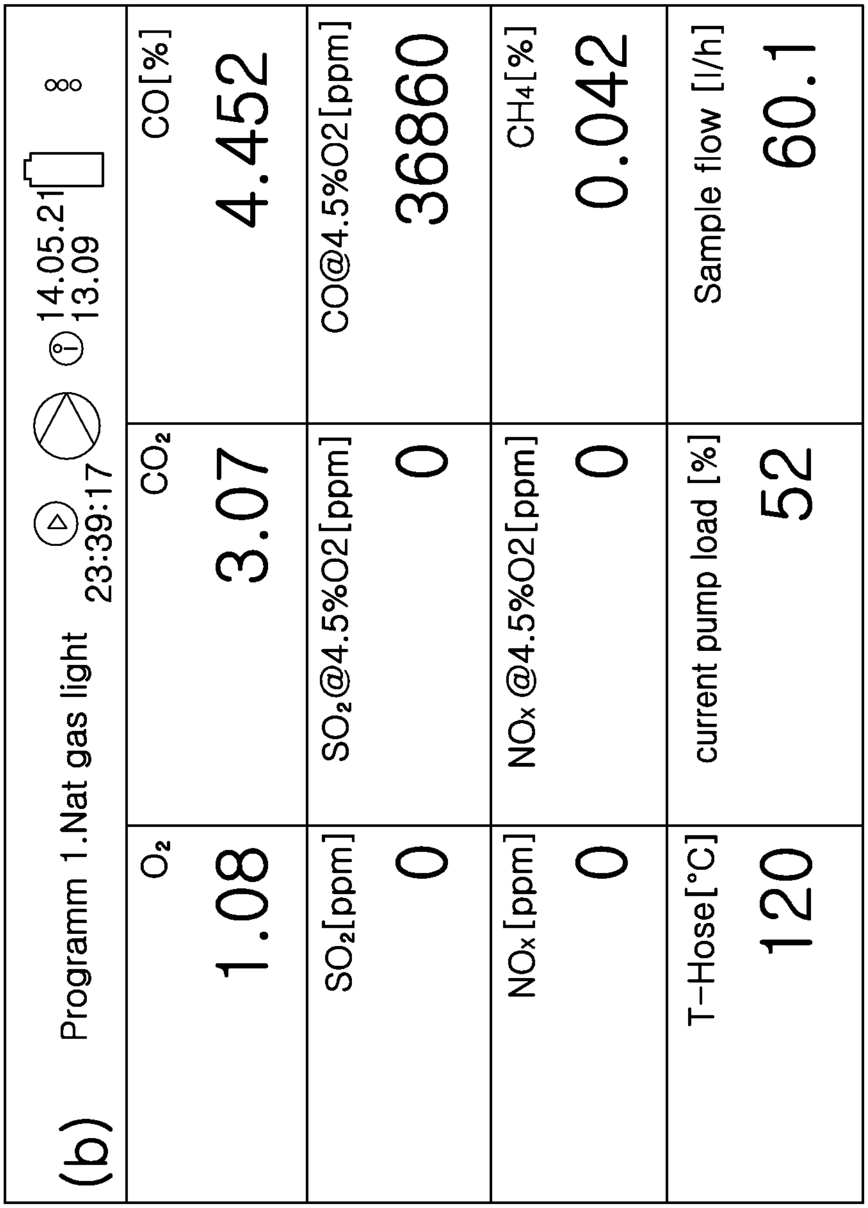
[FIG. 1B]
(b)
Programm 1.Nat gas light    △ ⊘ ⓘ 14.05.21
23:39:17        13.09  □  ∞
| O₂ | CO₂ | CO[%] |
|---|---|---|
| 1.08 | 3.07 | 4.452 |
| SO₂[ppm] | SO₂@4.5%O2[ppm] | CO@4.5%O2[ppm] |
|---|---|---|
| 0 | 0 | 36860 |
| NOₓ[ppm] | NOₓ @4.5%O2[ppm] | CH4[%] |
|---|---|---|
| 0 | 0 | 0.042 |
| T−Hose[°C] | current pump load [%] | Sample flow [l/h] |
|---|---|---|
| 120 | 52 | 60.1 |

[FIG. 1C]
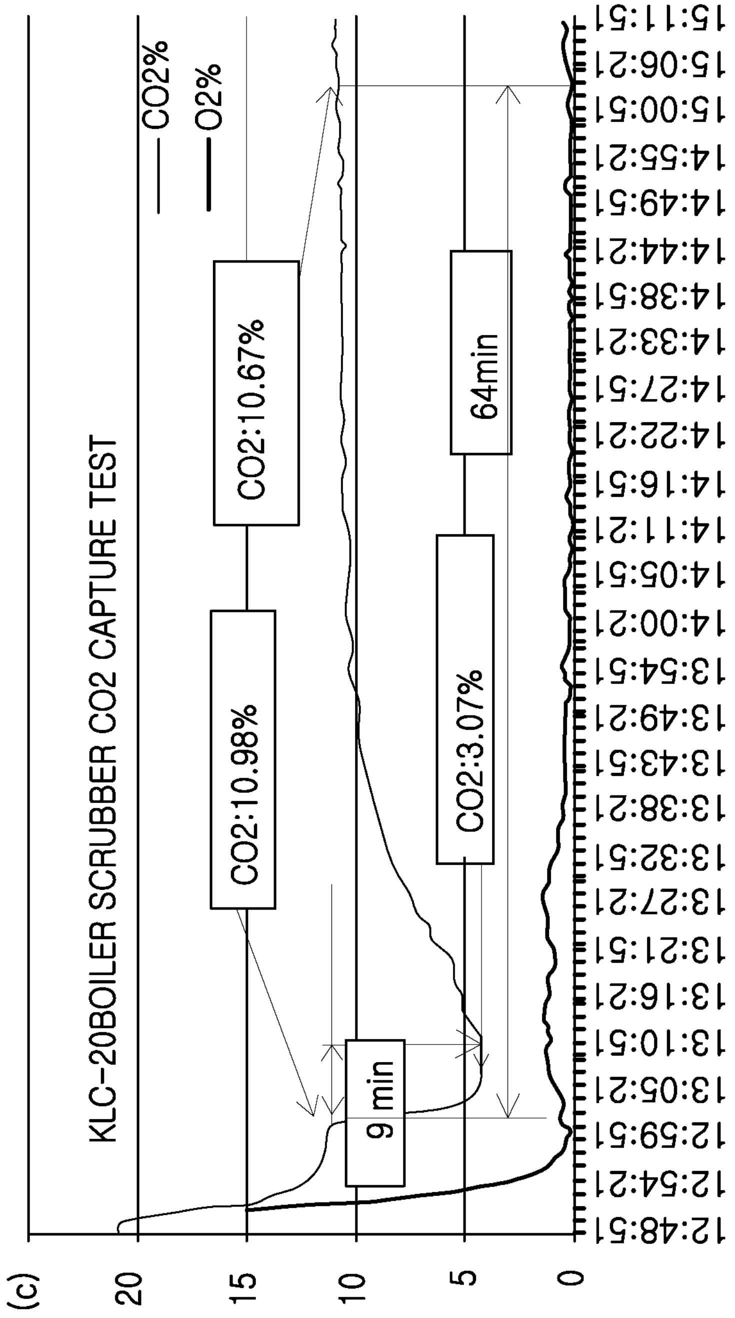

[FIG. 2]
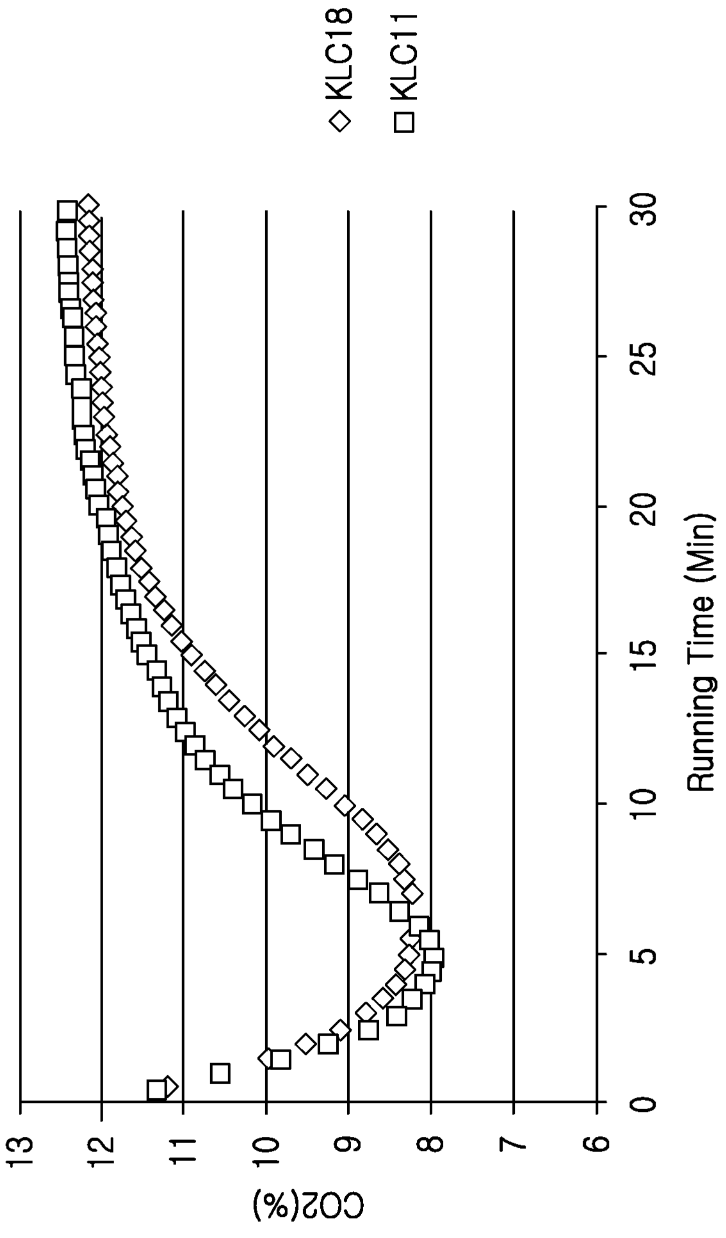

METHOD FOR MANUFACTURING CATALYST FOR CAPTURE AND CONVERSION OF CARBON DIOXIDE

CROSS-REFERENCE TO RELATED APPLICATION

This application is a 371 U.S. national stage of PCT/KR2022/008643, filed Jun. 17, 2022, which claims the benefit of Korean Patent Application No. 10-2021-0122358, filed Sep. 14, 2021, the contents of each of which are incorporated herein by reference.

TECHNICAL FIELD

The present disclosure relates to a method for manufacturing a catalyst for capturing and converting carbon dioxide into other useful materials while simultaneously removing carbon dioxide by capturing and converting carbon dioxide in flue gas generated during fossil fuel combustion into a carbon resource.

BACKGROUND ART

As for Global climate change, there are periodic alternations of ice ages and interglacial periods due to changes in orbit, cycles with varying angles of the axis of rotation, cycles of precession, and solar radiation, and the increase in temperature during the transition from the ice age to the interglacial period is increasing by 1° C. over 100 years. However, in recent years, the average temperature has risen by 0.74° C. over 100 years, which is seven times higher than the temperature increase caused by natural phenomena, indicating that this is due to artificial phenomena caused by human activities. Global warming is expected to disrupt the global ecosystem, rising sea levels, famine, the occurrence of diseases such as malaria, and changes in water shortages as global temperatures rise, causing great disasters for mankind.

In particular, carbon dioxide is designated as a greenhouse gas that causes global warming, and although the global warming index of carbon dioxide is lower than that of other greenhouse gases, it should be noted that carbon dioxide accounts for 80% of all greenhouse gas emissions and can regulate emissions. For this reason, the International Maritime Organization (IMO) finally decided to introduce the energy efficiency design index (EEDI) for new ships to be built in the future, and ships will have to reduce greenhouse gases by an average of 30% by 2025.

Accordingly, carbon dioxide capture and storage (CCS) technology is being actively studied as one of the alternatives to reduce the emission of carbon dioxide, which accounts for most of the greenhouse gases that cause global warming, according to the Climate Change Convention for the prevention of global warming.

Carbon dioxide capture and storage (CCS) technology is a technology that captures, transports, stores, or converts (immobilizes) greenhouse gases emitted from fossil fuel combustion. Since this technology can effectively reduce $CO_2$ emissions, the CCS technology is being considered as a realistic alternative to play the role of bridging technology until the economic feasibility of renewable energy is secured.

CCS is mainly used to reduce carbon dioxide generated during power generation using coal and gas, but it is also applied to carbon dioxide-intensive industries such as cement, steel, petrochemicals, and oil and gas production.

There are other storage methods, such as geological storage, marine storage, or storage in minerals. However, marine storage is currently prohibited due to concerns that it will pose a high environmental risk. Storage in minerals is the subject of current research, but technological developments such as energy use reduction and large-scale reduction technology improvement are still needed.

In addition, the most effective method for removing carbon dioxide from gas mixtures generated from hydrogen, steel, and cement production processes, combustion flue gases discharged from power plants using fossil fuels, and gases containing carbon dioxide, such as natural gas, is a chemical absorption method using an amine-based aqueous solution. As a chemical absorbing agent, aqueous amine solutions, such as monoethanolamine (MEA) and diethanolamine (DEA), etc., are being studied the most. This is because these amine-based absorbing agents react with carbon dioxide to easily form stable carbamate compounds, and these compounds are decomposed into carbon dioxide and amine by heat so that the alkanolamine absorbing agent can be regenerated.

However, this process has several serious problems in that, in particular, performance degradation of the absorbing agent due to the production and decomposition of by-products due to impurities such as NOx, Sox, and oxygen contained in the combustion flue gas, and the resulting device corrosion problem, a problem of consuming excessive renewable energy due to the regeneration temperature is higher than 120° C. due to the high thermal and chemical stability of carbamate produced by the reaction with carbon dioxide, a problem of excessive volatilization loss of alkanolamines due to high regeneration temperature, an absorbing agent supplementation problem accordingly, and a problem of contamination of separated carbon dioxide during the regeneration process due to the low vapor pressure of the absorbing agent, etc., are pointed out as disadvantages.

Therefore, it is necessary to develop a catalyst for stable carbon dioxide removal that is not affected by impurities other than carbon dioxide in combustion flue gas and does not consume excessive renewable energy.

DISCLOSURE

Technical Problem

An objective of the present disclosure is to provide a method for manufacturing a catalyst for capturing and converting carbon dioxide into other useful materials while simultaneously removing carbon dioxide by capturing and converting carbon dioxide in flue gas generated during fossil fuel combustion into a carbon resource.

Technical Solution

In order to solve the above problems, in one embodiment, the present disclosure provides a method for manufacturing a catalyst for capture and conversion of carbon dioxide, the method comprising: (a) preparing each of an oxide fine powder and a metal fine powder by each of an oxide powder and a metal powder, fine pulverizing respectively; (b) preparing a crystallized synthetic zeolite by adding an alumina-based raw material, a silica-based raw material, and sodium hydroxide to a reactor; (c) adding the oxide fine powder to the crystallized synthetic zeolite at regular time intervals, stirring, and mixing a first alkaline solution; (d) mixing a second alkaline solution with the mixture of step (c), then adding the fine metal powder at regular time intervals, and stirring; and (e) obtaining a catalyst for capture and conversion of carbon dioxide by mixing a third alkaline solution with the mixture of step (d) and stabilizing the mixture to extract only the liquid phase portion.

The fine oxide powder and the fine metal powder may have an average size in a range of 0.5 to 5 μm.

The step (b) may be to prepare a crystallized synthetic zeolite by adding an alumina-based raw material, a silica-based raw material, and sodium hydroxide to the reactor and then stirring at 30° C. to 70° C. for 1 to 10 hours.

In steps (c) and (d), the adding at predetermined time intervals may be performed by dividing a predetermined adding amount at intervals of 1 to 10 minutes.

In step (e), the third alkaline solution may be mixed, naturally cooled, and stabilized for 40 to 50 hours to be separated into the liquid composition and the precipitated powder composition.

The oxide powder may include at least one oxide selected from the group consisting of $SiO_2$, $Al_2O_3$, $Fe_2O_3$, $TiO_2$, MgO, Mno, Cao, $Na_2O$, $K_2O$, and $P_2O$.

The metal powder may include at least one selected from the group consisting of Li, Cr, Co, Ni, Cu, Zn, Ga, Sr, and Cd.

The alumina-based raw material may be sodium aluminate ($NaAl(OH)_4$), and the silica-based raw material may be sodium silicate ($Na_2SiO_3$).

The first, second, and third alkaline solutions may independently include one or more selected from the group consisting of potassium hydroxide (KOH), sodium tetraborate ($Na_2B_4O_7 \cdot 10H_2O$), sodium hydroxide (NaOH), sodium silicate ($Na_2SiO_3$), hydrogen peroxide ($H_2O_2$), and a combination thereof.

In addition, in one embodiment, the present disclosure provides a catalyst prepared according to the method for manufacturing the catalyst for capture and conversion of carbon dioxide, the catalyst includes: at least one oxide selected from the group consisting of $SiO_2$, $Al_2O_3$, $Fe_2O_3$, $TiO_2$, MgO, MnO, CaO, $Na_2O$, $K_2O$, and $P_2O_3$; at least one metal selected from the group consisting of Li, Cr, Co, Ni, Cu, Zn, Ga, Sr, Cd, and Pb; a crystallized synthetic zeolite prepared from an alumina-based raw material, a silica-based raw material, and sodium hydroxide; and at least one alkaline solution selected from the group consisting of potassium hydroxide (KOH), sodium tetraborate ($Na_2B_4O_7 \cdot 10H_2O$), sodium hydroxide (NaOH), sodium silicate ($Na_2SiO_3$), and hydrogen peroxide ($H_2O_2$).

The oxide may include 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of Cao, 15 to 45 parts by weight of $Na_2O$, 20 to 50 parts by weight of $K_2O$, and 5 to 20 parts by weight of $P_2O_3$, the metal may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb, the zeolite may be included in an amount of 75 to 420 parts by weight, and the alkaline solution may include 15 to 120 parts by weight of potassium hydroxide (KOH), 20 to 130 parts by weight of sodium tetraborate ($Na_2B_4O_7 \cdot 10H_2O$), 15 to 120 parts by weight of sodium hydroxide (NaOH), 50 to 250 parts by weight of sodium silicate ($Na_2SiO_3$), and 10 to 50 parts by weight of hydrogen peroxide ($H_2O_2$).

The catalyst for capture and conversion of carbon dioxide may capture 0.3 to 0.5 kg/h of carbon dioxide per 1 kg of the catalyst.

The catalyst for capture and conversion of carbon dioxide may have a pH in a range of 12 to 14.

Advantageous Effects

The present disclosure provides a method for manufacturing a catalyst for capture and conversion of carbon dioxide capable of removing carbon dioxide by converting the captured carbon dioxide into sodium carbonate or sodium bicarbonate (sodium hydrogen carbonate) at the same time as a solution phase catalyst for capture and conversion of carbon dioxide captures carbon dioxide.

The catalyst for capture and conversion of carbon dioxide, according to the present disclosure, can reduce carbon dioxide by capturing carbon dioxide in flue gas generated during the combustion of fossil fuels, such as thermal power plants, LNG, LPG, or fuel cell facilities. It is possible to convert the captured carbon dioxide into other useful materials by converting the collected carbon dioxide into sodium carbonate or sodium hydrogen carbonate as carbon resources.

In addition, the catalyst for capture and conversion of carbon dioxide, according to the present disclosure, can be used as a desulfurization agent for capturing sulfur oxides in flue gas generated during fossil fuel combustion by utilizing sodium carbonate or sodium hydrogen carbonate prepared from the captured carbon dioxide, thereby removing both carbon dioxide and sulfur oxide with one catalyst.

DESCRIPTION OF DRAWINGS

FIG. 1A shows the carbon dioxide capture test results (scrubber data before carbon dioxide capture) of the catalyst for capture and conversion of carbon dioxide according to the present embodiment;

FIG. 1B shows the carbon dioxide capture test results (scrubber data after carbon dioxide capture) of the catalyst for capture and conversion of carbon dioxide according to the present embodiment;

FIG. 1C shows the carbon dioxide capture test results (carbon dioxide capture saturation test results) of the catalyst for capture and conversion of carbon dioxide according to the present embodiment; and FIG. 2 shows the carbon dioxide capture test results according to Comparative Examples 1 and 2 in the present embodiment.

BEST MODE

Since the present disclosure may apply various changes and have various embodiments, specific embodiments will be illustrated in the drawings and described in detail in the detailed description.

While specific embodiments of the disclosure will be described herein below, they are only for illustrative purposes and should not be construed as limiting to the present disclosure. Accordingly, the present disclosure should be construed to cover not only the specific embodiments but also cover all modifications, equivalents, and substitutions that fall within the spirit and technical scope of the present disclosure.

In this disclosure, the term “include” or “have” is intended to designate that a feature, number, step, operation, component, part, or a combination thereof described in the specification exists and should be understood not to preclude the existence or addition of one or more other features, number, operation, component, component, or combination thereof.

Hereinafter, the present disclosure will be described in detail.

The present disclosure provides a method for manufacturing a catalyst for capture and conversion of carbon dioxide, the method comprising: (a) preparing each of an oxide fine powder and a metal fine powder by fine pulverizing each of an oxide powder and a metal powder, respectively; (b) preparing a crystallized synthetic zeolite by adding an alumina-based raw material, a silica-based raw material, and sodium hydroxide to a reactor; (c) adding the oxide fine powder to the crystallized synthetic zeolite at regular time intervals, stirring, and mixing a first alkaline solution; (d) mixing a second alkaline solution with the mixture of step (c), then adding the fine metal powder at regular time intervals, and stirring; and (e) obtaining a catalyst for capture and conversion of carbon dioxide by mixing a third alkaline solution with the mixture of step (d) and stabilizing the mixture to extract only the liquid phase portion.

The catalyst for capture and conversion of carbon dioxide manufactured according to the method of the present disclosure can reduce carbon dioxide by capturing carbon dioxide in flue gas generated during the combustion of fossil fuels, such as thermal power plants, LNG, LPG, or fuel cell facilities. The captured carbon dioxide is used to convert carbon into sodium carbonate or sodium hydrogen carbonate, thereby being converted into useful materials.

In addition, the catalyst for capture and conversion of carbon dioxide, according to the present disclosure, can be used as a desulfurization agent for capturing sulfur oxides in flue gas generated during fossil fuel combustion by utilizing sodium carbonate or sodium hydrogen carbonate prepared from the captured carbon dioxide, thereby removing both carbon dioxide and sulfur oxide with one catalyst.

Specifically, the method for manufacturing a catalyst for capture and conversion of carbon dioxide of the present disclosure may include the steps, in step (a), the oxide powder is melted in a furnace at 3 to 12 bar, 600° C. to 1,500° C. for 0.5 to 10 hours, cooled at room temperature, and then pulverized with a fine pulverizer to prepare an oxide fine powder.

The oxide powder may include at least one oxide selected from the group consisting of $SiO_2$, $Al_2O_3$, $Fe_2O_3$, $TiO_2$, MgO, Mno, Cao, $Na_2O$, $K_2O$, and $P_2O$.

The metal powder may include at least one selected from the group consisting of Li, Cr, Co, Ni, Cu, Zn, Ga, Sr, Cd, and Pb. The metal powder may be mixed and finely pulverized with a fine pulverizer into a fine powder to prepare a fine metal powder.

The fine oxide powder and the fine metal powder may have an average size in a range of 0.5 to 5 μm. For example, the oxide fine powder and the metal fine powder have an average size in a range of 0.5 to 4 μm, 0.5 to 3 μm, 0.5 to 2 μm, 0.5 to 1 μm, 1 to 5 μm, 2 to 5 μm, 3 to 5 μm or 1 to 2 μm. When the fine oxide powder and the fine metal powder are pulverized, the pulverization may be repeatedly performed until the size is satisfied with the above range.

In step (b), a crystallized synthetic zeolite may be prepared by adding an alumina-based raw material, a silica-based raw material, and sodium hydroxide to the reactor and then stirring at 30° C. to 70° C. for 1 to 10 hours.

The alumina-based raw material may be sodium aluminate ($NaAl(OH)_4$), and the silica-based raw material may be sodium silicate ($Na_2SiO_3$).

In step (c), the fine oxide powder is added to the crystallized synthetic zeolite at predetermined time intervals in units of 100 kg and stirred, and then the first alkaline solution may be mixed.

In step (c), the adding at predetermined time intervals may be performed by dividing a predetermined adding amount at intervals of 1 to 10 minutes. For example, the time interval may be 5 minutes.

In step (d), after mixing the second alkaline solution with the mixture of step (c), the fine metal powder may be added at predetermined time intervals in units of 20 g and stirred.

In step (d), the adding at predetermined time intervals may be performed by dividing a predetermined adding amount at intervals of 1 to 10 minutes. For example, the time interval may be 3 minutes.

In step (e), the third alkaline solution may be mixed with the mixture of step (d), cooled naturally, and stabilized for 40 to 50 hours to separate the liquid composition, and the precipitated powder composition. It is possible to obtain a catalyst for capture and conversion of carbon dioxide by extracting only a portion of the liquid composition as a supernatant.

The first, second, and third alkaline solutions may independently include one or more selected from the group consisting of potassium hydroxide (KOH), sodium tetraborate ($Na_2B_4O_7·10H_2O$), sodium hydroxide (NaOH), sodium silicate ($Na_2SiO_3$), hydrogen peroxide ($H_2O_2$), and a combination thereof.

For example, the first alkaline solution may include potassium sodium hydroxide (KOH), tetraborate ($Na_2B_4O_7·10H_2O$), and sodium hydroxide (NaOH).

For example, the second alkaline solution may include sodium silicate ($Na_2SiO_3$).

For example, the third alkaline solution may include hydrogen peroxide ($H_2O_2$).

In addition, the present disclosure provides a catalyst prepared according to the method for manufacturing the catalyst for capture and conversion of carbon dioxide, the catalyst includes: at least one oxide selected from the group consisting of $SiO_2$, $Al_2O_3$, $Fe_2O_3$, $TiO_2$, MgO, MnO, Cao, $Na_2O$, $K_2O$, and $P_2O_3$; at least one metal selected from the group consisting of Li, Cr, Co, Ni, Cu, Zn, Ga, Sr, Cd, and Pb; a crystallized synthetic zeolite prepared from an alumina-based raw material, a silica-based raw material, and sodium hydroxide; and at least one alkaline solution selected from the group consisting of potassium hydroxide (KOH), sodium tetraborate ($Na_2B_4O_7·10H_2O$), sodium hydroxide (NaOH), sodium silicate ($Na_2SiO_3$), and hydrogen peroxide ($H_2O_2$).

The catalyst for capture and conversion of carbon dioxide can improve carbon dioxide capture efficiency by including potassium hydroxide (KOH) as an alkali solution. For example, by including potassium hydroxide in the catalyst for capture and conversion of carbon dioxide, the carbon dioxide capture efficiency may be about 2.5 to 4 times higher than that of the case when potassium hydroxide is not included.

The oxide may include 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$, and 5 to 20 parts by weight of $P_2O_3$, the metal may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb, the zeolite may be included in an amount of 75 to 420 parts by weight, and the alkaline solution may include 15 to 120 parts by weight of potassium hydroxide (KOH), 20 to 130 parts by weight of sodium tetraborate ($Na_2B_4O_7 \cdot 10H_2O$), 15 to 120 parts by weight of sodium hydroxide (NaOH), 50 to 250 parts by weight of sodium silicate ($Na_2SiO_3$), and 10 to 50 parts by weight of hydrogen peroxide ($H_2O_2$).

The zeolite may be a crystallized synthetic zeolite prepared from 30 to 120 parts by weight of sodium aluminate ($NaAl(OH)_4$), 30 to 200 parts by weight of sodium silicate ($Na_2SiO_3$), and 15 to 100 parts by weight of sodium hydroxide.

The catalyst for capture and conversion of carbon dioxide may have a carbon dioxide capture effect by forming a transition metal oxide with the oxide, the metal, and the alkali solution as a positive catalyst of the following Formula.

Specifically, since the metal includes transition metals, a transition metal oxide may be formed by reacting the transition metals with the oxide in a reactor. The catalyst for capture and conversion of carbon dioxide may be the transition metal oxide, and the transition metal oxide serves as a positive catalyst and contains NaOH and KOH to react with carbon dioxide, thereby capturing carbon dioxide.

NaOH and KOH contained in the catalyst for capture and conversion of carbon dioxide may be reacted as shown in the following reaction Formula. The following reaction Formulae 1 (1-1 and 1-2) and 2 may occur in parallel and may be converted into a material for carbon resource formation by forming $NaHCO_3$ and $K_2CO_3$ as final reactants.

That is, the carbon dioxide capture conversion catalyst of the present disclosure is capable of simultaneously capturing carbon dioxide and converting the captured carbon dioxide into sodium carbonate, sodium bicarbonate (sodium hydrogen carbonate), or potassium carbonate while simultaneously removing carbon dioxide.

[Formula 1-1]

$$2NaOH + CO_2 \longrightarrow Na_2CO_3 + H_2O$$

[Formula 1-2]

$$Na_2CO_3 + H_2O + CO_2 \longrightarrow 2NaHCO_3$$

[Formula 2]

$$2KOH + CO_2 \longrightarrow K_2CO_3 + H_2O$$

The catalyst for capture and conversion of carbon dioxide may capture 0.3 to 0.5 kg/h of carbon dioxide per 1 kg of the catalyst. For example, the catalyst for capture and conversion of carbon dioxide may capture carbon dioxide in an amount of 0.3 to 0.45 kg/h, 0.3 to 0.4 kg/h, 0.3 to 0.35 kg/h, 0.35 to 0.5 kg/h, 0.4 to 0.5 kg, 0.45 to 0.5 kg/h, or 0.38 to 0.4 kg/h per 1 kg of carbon dioxide.

The catalyst for capture and conversion of carbon dioxide may be a basic solution and have an average pH in a range of 12 to 14. For example, the catalyst for capture and conversion of carbon dioxide may have a pH in a range of 12 to 13.5, 12 to 13, 12 to 12.5, 12 to 12.2, 12.2 to 14, 12.5 to 14, 13 to 14, or 13.5 to 14. The pH of the catalyst for capture and conversion of carbon dioxide may be an important indicator for determining the input amount of the catalyst. Specifically, since the pH value falls as the catalyst for capture and conversion of carbon dioxide captures carbon dioxide, when the pH value falls below a predetermined standard value, the carbon dioxide capture conversion catalyst may be additionally added.

The catalyst for capture and conversion of carbon dioxide may be used by mixing with water when used. When the catalyst for capture and conversion of carbon dioxide and water are mixed, the carbon dioxide capture rate may increase as the catalyst ratio in the mixture increases, but the mixing ratio with water may be adjusted in consideration of cost.

The catalyst for capture and conversion of carbon dioxide and water may be mixed in a ratio of 1:1 to 1:5. For example, the basic alkaline solution and water may be mixed in a ratio of 1:1 to 1:4, 1:1 to 1:3, 1:1 to 1:2, 1:2 to 1:5, 1:2 to 1:3 or 1:3 to 1:5.

The catalyst for capture and conversion of carbon dioxide, according to the present disclosure, may be used to remove carbon dioxide from flue gas discharged from boilers, incinerators, engines, etc., of ships, or flue gases discharged from thermal power plants, LNG, LPG, or fuel cell facilities, etc.

Hereinafter, the present disclosure will be described in more detail through Examples and the like according to the present disclosure, but the scope of the present disclosure is not limited by the Examples presented below.

EXAMPLE

In order to prepare the catalyst for capture and conversion of carbon dioxide according to the present disclosure, first, oxides composed of 150 kg of $SiO_2$, 150 kg of $Al_2O_3$, 100 kg of $Fe_2O_3$, 50 kg of $TiO_2$, 200 kg of MgO, 100 kg of Mno, 200 kg of CaO, 150 kg of $Na_2O$, 200 kg of $K_2O$, and 50 kg of $P_2O_3$ were mixed and melted in a furnace under the condition of 3 to 12 bar, 600° C. to 1,500° C. for 0.5 to 10 hours, and then cooled at room temperature. This was pulverized again with a pulverizer to prepare an oxide fine powder.

Mix metals composed of 35 g of Li, 50 g of Cr, 10 g of Co, 60 g of Ni, 180 g of Cu, 350 g of Zn, 400 g of Ga, 200 g of Sr, 20 g of Cd, and 30 g of Pb were mixed and finely pulverized to obtain a fine metal powder.

The fine oxide powder and the fine metal powder are repeatedly pulverized to have a particle size of 1 to 2 μm.

3,000 kg of water, 40 kg of sodium aluminate ($NaAl(OH)_4$), 40 kg of $NaSi_3$, and 25 kg of sodium hydroxide (NaOH) were put into the reactor and stirred at a temperature in a range of 30° C. to 70° C. for 1 to 10 hours to prepare a crystallized synthetic zeolite.

The fine oxide powder pulverized before was divided into 100 kg units and added into a reactor at intervals of 5 minutes. After stirring for 2 hours or more, 50 kg of sodium tetraborate ($Na_2B_4O_7 \cdot 10H_2O$), 25 kg of sodium hydroxide (NaOH), and 50 kg of potassium hydroxide (KOH) were simultaneously added and stirred for 30 minutes. While stirring, raising the temperature in a range of 40° C. to 80° C., and 100 Kg of sodium silicate ($Na_2SiO_3$) was added. After stirring for 30 minutes, the fine metal powder pulverized before was added in units of 20 g at intervals of 3 minutes and stirred.

After stirring for 1 hour, 30 kg of hydrogen peroxide ($H_2O_2$) was added, and the mixture was further stirred for 30 minutes, followed by natural cooling for 1 hour. After cooling and stabilizing for 48 hours, the liquid composition and the precipitated powder composition were separated from each other. A carbon dioxide electrochemical conversion catalyst (named KLC) was prepared by obtaining only the liquid composition.

Comparative Examples 1 (KLC-11) and 2 (KLC-18) were prepared in the same manner as the preparation method of the catalyst for capture and conversion of carbon dioxide (Example, KLC-20), according to the present disclosure, except that potassium hydroxide (KOH) is not included.

Experimental Example: $CO_2$ Capture Experiment

The prepared stock solutions of Example (KLC-20), Comparative Examples 1 (KLC-11) and 2 (KLC-18) were filled in a K-Scrubber tank, and flue gas pipes of a boiler (Miura GZ-300 boiler) using LPG as fuel were connected to the K-Scrubber. Carbon dioxide capture experiments were conducted by passing the flue gas discharged after combustion in the LPG boiler through the K-scrubber.

The specifications of the K-scrubber are as follows.

Used power: 1.3 KW

Duration of stay: 4 sec

Used solution: KLC-20 stock solution 105.48 kg (Specific gravity: 1.466)=72 L

Scrubber uptime: 1 hour 35 minutes

The carbon dioxide capture experiment results are shown in FIGS. 1, 2, and Table 1.

FIG. 1 is a carbon dioxide capture experiment result of the catalyst for capture and conversion of carbon dioxide according to the Example, showing gas meter data. [(a) scrubber data before carbon dioxide capture, (b) scrubber data after carbon dioxide capture, and (c) carbon dioxide capture and saturation experiment result)]

Referring to FIG. 1, the carbon dioxide capture experiment results of Examples are as follows.

1) $CO_2$ capture efficiency of Example: about 20% (area comparison)

Used solution: Example 105.48 kg (specific gravity: 1.466)=72 L

2) Calculation of captured $CO_2$ amount per 1 kg of Example

Total flue gas amount: 951.62 $Nm^3/h$=15.86 $Nm^3/min$.

Captured $CO_2$ in flue gas 10.98%, $CO_2$ capture efficiency; 20%, $CO_2$ density: 1.977 (g/L)

Captured $CO_2$ amount of Scrubber: 951.62 $Nm^3/h \times 1000$ $L/Nm^3 \times 0.1098 \times 0.2 \times 1.977$ g/L =41,314.52 g/h=41.31 kg/h Captured $CO_2$ amount per 1 kg of Example: 0.392 kg/h (41.31 kg/105.48 kg=0.392 kg/h)

3) pH after $CO_2$ capture: 12.2, specific gravity: 1.545

FIG. 2 shows the carbon dioxide capture experiment result according to Comparative Examples 1 and 2.

Referring to FIG. 2, the capture rate per 1 kg of Comparative Example 1 was 0.135 (13.5%), and the capture rate per 1 kg of Comparative Example 2 was 0.155 (15.5%), and when calculated based on 28 kg, the total capture amount of Comparative Example 1 was 3.78 kg (13.5%), and the total capture amount of Comparative Example 2 was 4.34 kg (15.5%).

Table 1 below shows the amount of captured carbon dioxide per 1 kg of input amount of each of Example and Comparative Examples 1 and 2.

TABLE 1

| | Boiler scrubber $CO_2$ capture rate | $CO_2$ capture (kg/klc kg · h) |
|---|---|---|
| Comparative Example 1 | 13.5% (area within the curve) | 0.11 kg/h |
| Comparative Example 2 | 15.5% (area within the curve) | 0.156 kg/h |
| Example | 20% (area within the curve) | 0.392 kg/h |

Referring to Table 1, it was confirmed that an Example containing KOH showed a carbon dioxide capture amount that was about 2.5 to 4 times greater than that of Comparative Examples 1 and 2 not containing KOH.

In summary, it was found that the catalyst for capture and conversion of carbon dioxide, according to the Example, had a 0.392 kg/h of $CO_2$ capture amount per 1 kg of the prepared Example catalyst, which had a better capture effect of about 60% than the catalyst for capture and conversion of carbon dioxide according to the Comparative Examples ($CO_2$ capture amount of 0.11 kg/h and 0.156 kg/h per 1 kg of the prepared Comparative Example catalyst, respectively).

INDUSTRIAL APPLICABILITY

The present disclosure can be widely used in the field of a method for manufacturing a catalyst for capture and conversion of carbon dioxide and a catalyst.

The invention claimed is:

1. A method of manufacturing a catalyst for capture and conversion of carbon dioxide, comprising:

(a) preparing each of an oxide fine powder and a metal fine powder by pulverizing each a oxide powder and a metal powder, respectively;

(b) preparing a crystallized synthetic zeolite by adding an alumina-based raw material, a silica-based raw material, and sodium hydroxide to a reactor with stirring;

(c) preparing a first alkaline mixture by adding the oxide fine powder to the crystallized synthetic zeolite prepared from step (b) at predetermined time intervals with stirring followed by adding a first alkaline solution;

(d) preparing a second alkaline mixture by adding a second alkaline solution to the first alkaline mix prepared from step (c) followed by adding the metal fine powder at predetermined time intervals with stirring; and (e) obtaining a catalyst for capture and conversion of carbon dioxide by preparing a third alkaline mixture by adding a third alkaline solution to the second alkaline mixture prepared from step (d) and stabilizing the second alkaline mixture for 40 to 50 hours, followed by extracting only a liquid portion, wherein the oxide contains 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$, 5 to 20 parts by weight of $P_2O_3$ or a mixture thereof;

the metal contains 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, 0.003 to 0.005 parts by weight of Pb or a mixture thereof;

the zeolite is contained in an amount of 75 to 420 parts by weight;

the first alkaline solution contains 15 to 120 parts by weight of potassium hydroxide (KOH), 20 to 130 parts by weight of sodium tetraborate ($Na_2B_4O_7 \cdot 10H_2O$), 15 to 120 parts by weight of sodium hydroxide (NaOH) or a mixture thereof;

the second alkaline solution contains 50 to 250 parts by weight of sodium silicate ($Na_2SiO_3$); and the third alkaline solution contains 10 to 50 parts by weight of hydrogen peroxide ($H_2O_2$), the potassium hydroxide (KOH) or a mixture thereof.

2. The method of claim 1, wherein the fine oxide powder and the fine metal powder have an average size of 0.5 to 5 μm.

3. The method of claim 1, wherein in step (b), the crystallized synthetic zeolite is prepared by adding an alumina-based raw material, a silica-based raw material, and sodium hydroxide to the reactor and then stirring at 30° C. to 70° C. for 1 to 10 hours.

4. The method of claim 1, wherein in steps (c) and (d), adding at predetermined time intervals is performed by dividing a predetermined adding amount at intervals of 1 to 10 minutes.

5. The method of claim 1, wherein in step (e), a liquid composition and a precipitated powder composition are separated after mixing the third alkaline solution, natural cooling, and stabilizing for 40 to 50 hours.

6. The method of claim 1, wherein the obtained catalyst for capture and conversion of carbon dioxide captures carbon dioxide and simultaneously converts the captured carbon dioxide into sodium carbonate or sodium bicarbonate (sodium hydrogen carbonate) to remove carbon dioxide.

* * * * *